Nov. 23, 1954     E. M. TRAMMELL, JR     2,694,917
LOCKING PLUNGER ASSEMBLY FOR AUTOMOBILE DOOR LATCHES
Filed Dec. 19, 1951
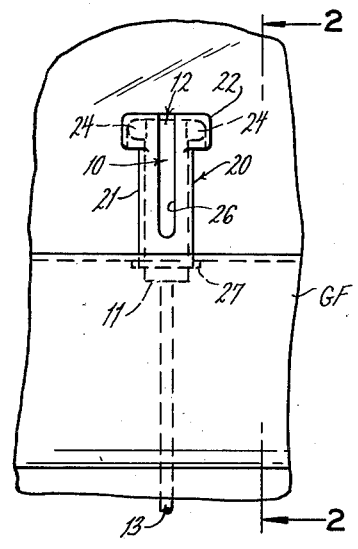
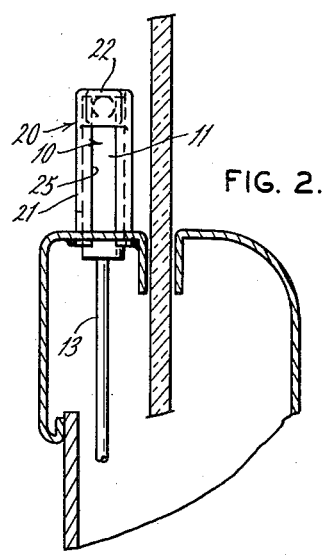
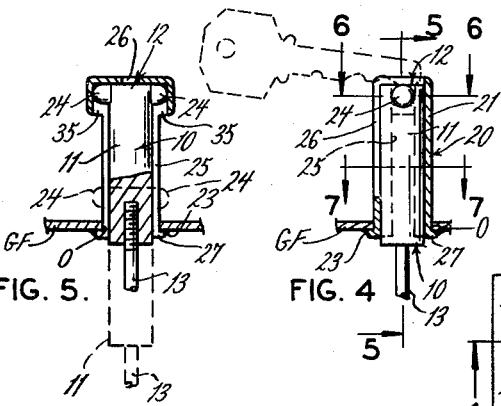
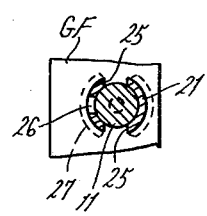
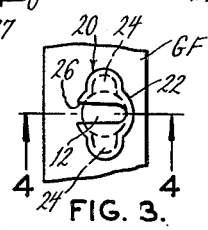
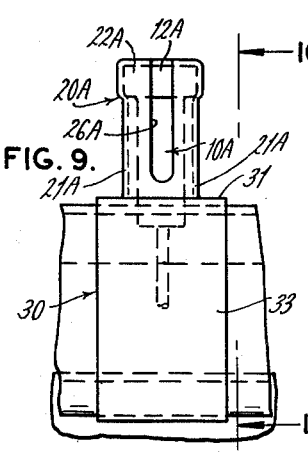
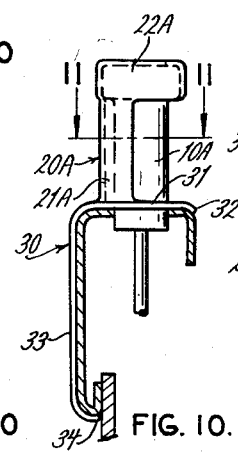
INVENTOR.
EARL M. TRAMMELL, JR.
BY Terry & Cohn
ATTORNEYS United States Patent Office 2,694,917
Patented Nov. 23, 1954

2,694,917
LOCKING PLUNGER ASSEMBLY FOR AUTOMOBILE DOOR LATCHES

Earl M. Trammell, Jr., St. Louis, Mo.

Application December 19, 1951, Serial No. 262,419

10 Claims. (Cl. 70—174)

This invention relates to improvements in locking plunger assembly for automobile door latches, and more particularly to novel provisions for preventing inadvertent manual operation of inside locking plungers associated with car doors, the present improvements being adapted for use selectively as equipment attachments or as accessories applicable to the doors of automobiles now in usage.

Most automotive vehicles of closed-body or closed-cab types are provided with door-locking plungers, usually arranged for manual reciprocal movement and located for access to an occupant of the car from points within the car body. Many makes of automobiles include door-locking plungers and lock mechanism such that the door is conditioned in advance for locking, by depressing such a locking plunger, then closing the door, requiring a door key for reopening the door from the outside. The peculiarities of certain such mechanism are such that if, inadvertently, the operator neglects to remove the car keys from the ignition switch, then depresses the plunger and closes the door, it is impossible to regain access to the car without a duplicate key. The present invention accordingly has as its principal objective the purpose of obviating or at least rendering exceedingly difficult, the condition noted, by requiring depression of the door-lock plunger to a locking condition through the use of a car key or other relatively thin object, thus preventing unintended setting of the plunger as may otherwise occur through habit in leaving the car.

Otherwise expressed in terms of tangible structure characterizing the present improvements, a further and important objective is realized in a plunger enclosure for the purpose noted, which precludes depressing actuation of the plunger by the finger, yet permits the plunger to be be key actuated. The plunger may be manually restored at will to a door-unlocking position following plunger depression.

Still another and valuable objective of the present improvements is realized in a hollow, fixed, plunger housing for the purposes noted, which is or may be so formed as to constitute a plunger guide and shroud, and which serves to constrain the plunger to a guided reciprocal movement in its intended path, the housing further being of such nature as to prevent inadvertent depression of the plunger as by the arm or clothing at any time other than when the door is purposely to be conditioned for locking.

Yet another major objective of the present improvements is realized in a plunger housing for the purposes noted and which may be applied to any of a variety of existing car doors in the region of the locking plunger, merely by snap-on engagement to the glass-framing structure, without necessitating special skill or tools for such attachment.

The foregoing and numerous other objects and advantages of the invention will more clearly appear from the following detailed description of certain presently preferred embodiments fully described in the ensuing description and illustrated in the accompanying drawings, in which:

Fig. 1 is a side elevational view of the assembly and appurtenant parts, when installed on an automobile door;

Fig. 2 is a vertical sectional elevation of the assembly as viewed along line 2—2 of Fig. 1;

Fig. 3 is a top or plan view of the plunger housing;

Fig. 4 is a sectional view as taken along line 4—4 of Fig. 3;

Fig. 5 is a sectional view taken in a vertical plane at a right angle to Fig. 4, and showing the plunger in depressed position;

Fig. 6 is a transverse section of portions of the assembly as viewed along line 6—6 of Fig. 4;

Fig. 7 is a transverse sectional view along line 7—7 of Fig. 4;

Fig. 8 is a sectional view which is similar as to plane of section, to Fig. 7, but showing the parts as same would appear when the plunger is depressed;

Fig. 9 is a view of the assembly of Fig. 1 as mounted on an attachment clip.

Fig. 10 is a partly sectional view of the assembly of Fig. 9, taken along line 10—10 thereof, and Fig. 11 is a transverse sectional view on line 11—11 of Fig. 10.

Referring now by characters of reference to the drawing, a form of the structure embodying the present improvements in a form suitable for usage as original equipment at the time of manufacture of the vehicle, includes a glass-frame element GF, projecting outwardly, usually vertically of which through a suitable opening 0 is a plunger knob generally designated at 10 and including a shank 11 surmounted by a somewhat larger terminus or head 12. The knob 10 is usually threadedly connected to a metal actuating rod 13 in such manner, familiar to those skilled in the art, that when as by finger pressure on the knob 12, the rod 13 in a downward movement so conditions the lock of the car door that when closed and latched, it is impossible to reopen the door without use of the car door key from a point outside of the vehicle. When, however, the plunger head 10 is in raised position, according to usual practice, the door may be freely opened by actuation of a latch arm or button located externally of the door. Thus for purposes of present description, but without limitation to specific positions of the plunger, it will be understood that an outermost or raised position thereof indicates an unlocked door condition, whereas the lowermost or relatively retracted plunger position indicates that the door is or will be locked when closed.

In the form shown by Figs. 1 and 2, a plunger housing generally indicated at 20 includes a stem portion 21 which is hollow, and above and preferably an integral part of which is a hollow cover or cap structure 22, from which it will appear that, as a preference, the structure 20 is of a substantially T shape longitudinal section and will usually be located to project vertically above the adjacent element GF. For purposes of attachment, the stem structure is provided with right angled extensions, each underlying the adjacent part of the frame GF, being secured thereto as by welding points 23 or other desired attachment expedients.

It is a preference in connection with the present plunger assembly including the plunger 10 and housing 20, to form the head of the plunger with one or a pair of diametral projections 24, for a purpose later appearing. When the plunger head is so formed, the stem portion 21 of the enclosure or housing, is provided with one or more longitudinal slots 25, the width of each such slot being just slightly greater than the width of the wings or projections 24 on the plunger head. The proportions of the housing member 21, the slots 25 and the width of wings 24, are such that in assembly, the wings 24 will project through and outwardly of the slots 25, whereby the plunger in moving between raised and lowered positions, is guided by the wings and slots and thus constrained to a rectilinear movement.

The uppermost or top surface of the hollow head 22 of the housing structure 20 may be flat or if desired, slightly crowned, but is by preference provided with a substantially horizontal slot 26, this slot extending also downwardly through the adjacent marginal portion of the cap of the housing, and is thence continued downwardly over one side of the stem 21. Slot 26 is, importantly, of such reduced width that it is utterly impossible for the finger of the operator to be inserted therethrough, into effective operating engagement with the plunger. At the same time, although slot 26 is of restricted width, its width is yet such that the end portion of the shank of a door key or ignition key (these sometimes being one and the same), may be inserted into and downwardly along the slot 26 while bearing against the plunger, so that the plunger may be depressed through downward pressure on the key and thus brought to a retracted position to condition the car door for locking.

A modified form of housing and attachment is best shown in Figs. 9, 10 and 11. In the mounting arrangement first described, the welding spots or other fastenings 23 coact with the right angle arms designated at 27. In the modified mounting, the same fastening expedients may be employed to attach the hollow plunger housing 20A to a spring base, which may be designated as a spring clip, and which is generally indicated at 30, or if preferred, the plunger housing and base may be made of a single piece of metal or other material. This structure includes a substantially planar portion 31 to which the stem 21A is attached. One side of the base 31 is continued into a short finger or prong 32, or plurality thereof, and on the opposite side of the portion 31 the attachment clip is continued outwardly and downwardly through a portion 33 which may be referred to as a spring arm, particularly if the clip 30 be made of a tempered metal stock. Beyond the arm 33 is a similar spring arrangement exemplified by one or more narrow flanges 34. These are displaceable to a degree such that they may be attached in gripping engagement with the usually metal frame element GF about the glass of the door. It will be possible in most cases to install the device without necessarily removing the adjacent element GF from the door. In such case the plunger head is first depressed, then unthreaded from the rod therebelow. The head may be laterally inserted into the hollow stem 21A, and the flanges 32 or 34 on one margin of the clip are inserted under the selected margin of the member GF, the device with the plunger head therein is brought down over and around the member GF, and the opposite flange inserted beneath the opposite margin of the frame element. Assuming clip 30 to be of spring stock, the inherent spring tension will retain the plunger enclosure in place securely and without danger of vibration, rattling or inadvertent displacement along the frame. It will appear from Fig. 11 that the plunger head is readily accessible, with the attachment in place, to permit the head to be threaded onto the plunger rod therebelow. If desired, one side of the plate portion 31 may be left open, to permit the device to be laterally applied without removal of the plunger head.

The arrangement of Figs. 9, 10 and 11 is particularly adapted for application to cars in service, and with this purpose, the plunger 10A may be of a conventional type, having a circular top or knob 12A. The stem portion 21A of the modified arrangement may consist of two spaced, usually vertical posts, beyond which the stem is sufficiently open to permit the finger to be inserted beneath knob 12A, for lifting same to a door-unlocking position. However the cap 22A is of a full circular aspect in plan, and is provided with the key slot 26A which extends downwardly along the housing stem similarly to slot 26 above described.

The manner of usage of the device as described is thought to have become fully apparent from the foregoing description of elements and features of preferred structure in the embodiments shown, but it may be noted for completeness that, assuming the plunger housing or enclosure to have been installed in place over the plunger, the plunger 10 will, during operation of the car, normally remain in raised or extended position. It will be noted as entirely impossible by accident or through casual pressure say of the arm or clothing on the plunger, to depress same when the housing is in assembly. When, however, it is desired to leave and lock the car, it will be seen as obviously impossible for the operator through habit, inadvertence or otherwise, to depress the plunger in the conventional manner to a door-locking position. He is now compelled first to withdraw his key holder and keys, or at any rate his single key from the ignition socket, then with the key or keys in hand, the end of the ignition or door key is set into the slot 26 or 26A, and by downward pressure on the key, the plunger is depressed. It will be noted that the positioning and guiding effect of the sides of the slot 26 or 26A against the flat sides of the key shank, is such that the key will not rock in the hand but will be kept in edgewise relation to the top of the plunger throughout the depressing actuation. This movement of the plunger to condition the door to be locked, is continued until the plunger has reached its lowermost position, whereupon the key is readily withdrawn outwardly through the slot. Scarcely any more time is required for the depression of the plunger than would be needed for manual actuation of same.

Since there is no need to require a key to bring the plunger from its depressed to its uppermost position within the housing, this may be readily accomplished by engagement of the fingers below one or both of the wings 24 which, as will now appear, project laterally and exteriorly of the stem portion 21 of the plunger housing; alternately, the finger is inserted, for lifting, beneath the head 12A. The lifting of the plunger is continued to an extent to bring same upwardly and fully into the hollow cap 22 or 22A of the housing, it being noted that the lower peripheral portion of the cap proper 22 is provided, as will appear from Fig. 5, with a pair of diametral ports or recesses 35 which are of a size to accommodate the wings 24, thereby permitting same to move freely into and out of the cap according to direction of plunger movement.

It will now have appeared that the present attachment when utilized in combination with a plunger of the type and for the purposes noted, will serve fully to realize the several objects above stated, and others implied from the description. Although the invention has been disclosed by detailed reference to certain selected embodiments, the detail of description shown be understood solely in an instructive, rather than in any limiting sense, many variants being possible within the intended scope and fair breadth of the claims hereunto appended.

I claim as my invention:

1. In an inside-locking plunger assembly for car door locks, a reciprocally-movable locking plunger projecting from a door, a hollow, fixed enclosure about the plunger and including an outermost closure portion overlying the head of the plunger, and provided with a slot extended in a direction transversely of such outer closure portion thence extended a distance along the enclosure, the slot being of a width restricted to receive, with working clearance, the shank of a key, whereby to guide such key upon insertion thereof in, and movement of the key along the slot to depress the plunger, the plunger and enclosure including coacting guide portions constraining the plunger to a linear movement.

2. In combination with a reciprocal door-locking plunger, an enclosure including a hollow, fixed stem portion normally extending about the shank of a plunger and substantially parallel thereto, the outer portion of the enclosure being provided with a slot so located and of a width such as to permit insertion of the shank of a key through the slot and normal to the plunger, with the sides of the slot in guiding relation to the key shank, the slot being extended along the stem portion throughout the path of travel of the plunger, and coacting guide portions on the plunger and enclosure, acting to constrain the plunger to a linear movement.

3. An enclosure adapted as a shroud for a reciprocal door-locking plunger, said enclosure including a cover portion and a stem portion, the stem portion of the enclosure normally extending about the shank of a plunger in the housing and substantially parallel thereto, the cover portion being provided with a substantially transversely slotted aperture of a width such as to permit insertion of the shank of a key laterally into, thence through the slot, with the sides of the slot in guiding relation to the key shank, and the stem portion of the enclosure being provided with a key-guiding slot communicating with said slotted aperture, thence extended along said stem portion in a direction such that a lateral, translatory movement of the key may be imparted to the plunger for actuation of same in one direction.

4. The combination with an inside vehicle door lock including a reciprocally operable plunger adapted for conditioning the door to lock upon depression of the plunger from the inside of the door, an enclosure for the plunger comprised of a hollow cap portion and a hollow stem portion by which the cap portion is carried, the cap portion having a slotted opening of a size at least equal to the sectional dimensions of a door key shank, such opening permitting insertion of a key therethrough for depressing actuation of the plunger, the plunger having a head thereon and a lateral extension on the head, the hollow stem having a slot in which said head extension is guidedly movable, and through which such extension extends outwardly of the stem, whereby to enable outward or upward movement of the plunger by finger engagement with the extension externally of the stem, the cap portion of the enclosure being proportioned to receive therein the lateral extension of the plunger head when the latter is in an outermost position, whereby to preclude finger actuation of the plunger away from such position.

5. In an inside door locking assembly for use on automobile doors, a locking plunger functionally associated with the door lock for conditioning same to prevent opening of the door from outside of the car, the plunger including a head, opposite lateral projections on the head, and a stem by which the head is carried, a plunger housing about the plunger and head and serving substantially to enclose same, the plunger housing including a hollow cap overlying the head and a hollow stem upon which the cap is supported, the stem being provided with opposite longitudinal slots proportioned to receive and guidedly to engage the lateral projections on the plunger head, and the cap being provided with openings receiving said projections when the plunger is moved to an outermost position, the cap being provided with a top opening the width of which does not materially exceed the thickness of the shank of a key, the end of the key shank being insertable through such opening for depression of the plunger.

6. An inside door-locking plunger assembly for use in combination with an automobile door provided with glass and a glass-frame structure and trim about the glass, a liftable and depressible inside-locking plunger projecting through the glass-frame element in an accessible position, a plunger housing, means for attaching the housing to the glass frame element about the plunger, the housing being so proportioned as substantially fully to enclose the plunger, the housing being provided with a slot through which a car key of flat-shank type may be inserted for depressing the plunger, the plunger being provided with projecting means enabling the plunger to be manually lifted to a door-unlocking position, the housing having an upper formation receiving said projecting means when the plunger is in a door-unlocking position, said upper formation then acting to shroud said projecting means against digital engagement for plunger actuation.

7. In an inside locking plunger assembly for use on automobile doors in which there is provided a glass and a glass-frame thereabout, together with an inside locking plunger projecting through a portion of said glass frame, a housing closely surrounding and substantially completely enclosing the plunger, a base to which the innermost portion of the housing is attached for support of same, and means on said base providing for snap-on attachment of the housing to an adjacent glass-frame element of the door.

8. As an article of manufacture, a substantially tubular cap enclosure for an inside door-locking plunger of an automobile door, in which enclosure the cap portion of the enclosure is provided with a key slot proportioned to receive and guide a flat-shank key insertable through the slot for depression of the plunger, and a spring clip forming a base for said enclosure and to which the enclosure is attached, the spring clip having attachment prongs adapted to engage, embrace and partly underlie opposite marginal portions of a glass-frame of a door with which the plunger-enclosure is to be utilized.

9. A door-locking assembly for automobile doors provided with a lock, a vertically reciprocal inside door-locking plunger depressible to condition the door-lock against opening of the door from the exterior thereof, said plunger including a shank and means connecting the shank to the lock mechanism, a knob attached to the shank and proportioned to project exteriorly of an adjacent trim element of the door, the plunger knob being characterized by diametrically opposite wings, a fixed plunger housing comprised of a hollow cap portion and a hollow stem portion below and carrying the cap portion, the stem portion of the housing being provided with opposite longitudinal slots guidedly receiving the wings on the head of the plunger and through which slots the wings extend, the cap portion of the housing having lower perimetral openings to permit the wings, when the plunger is outermost, to extend into the cap portion of the housing, whence the wings are movable downwardly for locking purposes along said slots, the cap portion being provided with a transverse key-receiving and -guiding slot of a relatively narrow width such as to preclude actuation of the plunger by the finger yet such as to permit the outer extremity of the key shank to be inserted guidedly through the slot for depression of the plunger, a metal support to which the lower portion of the housing is attached, said support being of a deformable character and so adapted to any of a variety of glass-frame sections adjacent the plunger, the support being provided with opposite tangs or fingers adapted to be inserted beneath and folded back under opposite margins of the adjacent glass-frame structure for positioning the housing in place with respect to the frame structure and plunger.

10. An inside car door-locking plunger assembly including an inside locking plunger and a fixed, upstanding, hollow, partial enclosure therefor provided with a top opening and a longitudinal key receiving and guiding slot communicating with and extended below said opening, said opening and slot being of a size to preclude finger access to the plunger therethrough, yet adequate to permit plunger actuation by translatory movement of a key applied therethrough in a direction normal to the plunger.

References Cited in the file of this patent

UNITED STATES PATENTS

| Number | Name | Date |
| --- | --- | --- |
| 1,287,973 | Gruber | Dec. 17, 1918 |
| 1,580,611 | Kirkpatrick | Apr. 13, 1926 |
| 2,243,155 | Hizdos | May 27, 1941 |